US006844692B1

(12) United States Patent
Jasinski et al.

(10) Patent No.: US 6,844,692 B1
(45) Date of Patent: Jan. 18, 2005

(54) CLIMATE CONTROL SYSTEM AND MOTOR ACTUATOR THEREFOR

(75) Inventors: Richard Paul Jasinski, Highland, MI (US); Ralf Richter, Plymouth, MI (US)

(73) Assignees: Hella Electronics Corp., Plymouth Township, MI (US); Behr-Hella Thermocontrol Inc., Plymouth Township, MI (US)

( * ) Notice: Subject to any disclaimer, the term of this patent is extended or adjusted under 35 U.S.C. 154(b) by 0 days.

(21) Appl. No.: 10/645,515

(22) Filed: Aug. 22, 2003

(51) Int. Cl.[7] ............................................. G05B 5/00
(52) U.S. Cl. ......................................... 318/446; 318/268
(58) Field of Search ................................. 318/446, 268, 318/445; 310/233

(56) References Cited

U.S. PATENT DOCUMENTS

| | | | |
|---|---|---|---|
| 3,781,618 A | 12/1973 | Kruszynski | |
| 3,851,237 A | 11/1974 | Yokoyama et al. | |
| 4,110,768 A | 8/1978 | Numata | |
| 4,514,670 A | 4/1985 | Fassel et al. | |
| 4,795,867 A | 1/1989 | Ohi et al. | |
| 4,877,926 A | 10/1989 | Yamase | |
| 5,446,328 A | 8/1995 | Suzuki et al. | |
| 5,610,484 A | 3/1997 | Georgin | |
| 2001/0022505 A1 | 9/2001 | Ohno et al. | |
| 2002/0163259 A1 | 11/2002 | Ohno et al. | |
| 2003/0128003 A1 * | 7/2003 | Marusarz | 318/268 |
| 2003/0137211 A1 * | 7/2003 | Ito et al. | 310/233 |

FOREIGN PATENT DOCUMENTS

| | | |
|---|---|---|
| JP | 3106864 | 5/1991 |
| JP | 8146031 | 6/1996 |
| JP | 9023617 | 1/1997 |
| JP | 9191621 | 7/1997 |
| JP | 2000023424 | 1/2000 |
| JP | 2000321008 | 11/2000 |
| JP | 2001-238424 | 8/2001 |
| WO | WO 03/055043 A1 | 7/2003 |

* cited by examiner

*Primary Examiner*—Karen Masih
(74) *Attorney, Agent, or Firm*—Birch, Stewart, Kolasch & Birch, LLP

(57) ABSTRACT

A motor actuator (52) of a climate control system (37) includes an specialized electric motor (62) with a motor housing enclosing an encoder ring (104) on a motor shaft (77) having a plurality of opposite encoder-segment sets with encoder brushes (96a–b) on the housing wiping the encoder ring and thereby forming an encoder circuit through opposite segments of the encoder-segment sets. The electric motor further includes power and encoder terminals (98a–b and 100a–b) positioned externally of the motor housing with at least one power terminal being electrically coupled to one of the power brushes and at least one encoder terminal being electrically coupled to one of the encoder brushes. A control head (58) of the system includes a continuity pulse counter (72) coupled to the at least one encoder terminal for creating pulses representative of impedance in the encoder circuit and, therefore, movement of the motor shaft and a damper (40) linked thereto.

34 Claims, 5 Drawing Sheets

CLIMATE CONTROL SYSTEM AND MOTOR ACTUATOR THEREFOR

BACKGROUND OF THE INVENTION

This application relates generally to climate control (heating, ventilating and air-conditioning, or HVAC) systems, especially to those used for motor vehicles, and more specifically to motor actuators therefor and electric motors for such actuators.

Climate control systems, particularly those for motor vehicles, normally include air passages having movable dampers therein to control airflow through the passages. The movable dampers are usually moved by hand-manipulating hand-controlled elements. In this respect, an operator manipulates one of the hand-controlled elements to move one or more of the dampers to a respective desired position for achieving a desired airflow pattern in the passage(s). In the past, the hand-controlled elements have been coupled with the dampers in various ways for moving the dampers. For example, hand-controlled elements have been directly attached to the dampers by cables so that when the hand-controlled elements are manipulated the cables move the dampers. In other systems, hand-controlled elements have controlled vacuums, for applying the vacuums to move dampers.

More recently, dampers have been moved by small electric motors at the dampers, with electrical signals being sent to the electric motors in response to manipulation of the hand-controlled elements. In this respect, some such motors have been packaged as motor-actuator components, each motor-actuator including at least a motor and gears for achieving a desired mechanical advantage between the motor and its associated damper.

A problem that arises from use of electric motors for changing positions of dampers is that the motors do not automatically stop when their dampers reach desired positions set by the hand-controlled elements. Thus, additional electronic and/or mechanical devices must be provided for assuring that the power signals are turned off once associated dampers reach desired positions.

A simplified version of one such prior-art system for moving a damper 10 is depicted in FIG. 2. In this prior-art system, a motor actuator 16 includes, in addition to a motor 12 and gears 14, a rheostat-type (or potentiometer-type) component 18 that is represented in FIG. 2 by a simple potentiometer. Examples of similar such systems are disclosed in U.S. Pat. No. 4,795,867 to Ohi et al. and U.S. Pat. No. 4,877,926 to Yamase. In any event, in the simplified system of FIG. 2, as the motor 12 moves the damper 10 via the gears 14, the gears, or some linkage to the gears, also moves one or more brushes 20 of the potentiometer 18 to provide feedback to a motor control unit (MCU) 22 of a control head 24. The MCU 22 compares this feedback 21 with positions of hand-controlled elements 26 to determine when a motor driver 28 should discontinue sending power signals for driving the DC electric motor 12. Such a system as is depicted in FIG. 2 is sometimes referred to as a five-pin potentiometer feedback system because it involves five terminals for the motor actuator: two power terminals for receiving the motor-driving power signals 29, and three terminals for the rheostat-type component 18 (which requires a ground wire 30, a power voltage wire 32, and a feedback wire 21). A similar system might also be carried out as a four-terminal system, although it would have to be arranged differently than shown in FIG. 2.

Systems like that of FIG. 2 have several drawbacks. One problem is that each motor actuator must include a rheostat-type, or potentiometer-type, component, which makes the motor actuator unduly expensive. Further, such a system often requires five wires between the control head and the motor actuator, again increasing complexity and adding to expenses.

Such an electric-motor system as shown in FIG. 2 has the benefit that it provides an absolute position feedback, an initial full-range calibration is required for each motor actuator so that the motor control unit (MCU) 22 can learn all angular positions of the damper 10 corresponding to feedback signals on the line 21.

More recently, a different electric-motor system has been employed for automotive HVAC systems, namely, a back EMF pulse count system as depicted in FIG. 3. In this system, a control head 33 includes a back EMF pulse counter 34 that counts back EMF pulses on power-signal lines 29 that automatically arise when the motor driver 28 drives the motor 12. A count of these back EMF pulses provides an indication of motor shaft rotation and, therefore, movement of the damper 10. In theory, if an MCU 36 of the control head 33 is calibrated to know an end position of the damper 10, for example a position when the damper 10 completely closes an air passage, then it will also know other positions of the damper 10 corresponding to particular counts of back EMF pulses away from the end position. This system has the benefit of eliminating the rheostat-type component 18 and reducing the number of terminals and wires.

However, the system of FIG. 3 suffers from a number of other disadvantages. One problem is that the back EMF pulse counter 34 is a rather complicated and specialized device that must be manufactured by a specialized manufacturer. Further, the accuracy of such a back EMF pulse counter 34 is adversely affected by the erratic nature of back EMF. In addition, the wearing of motor power brushes, and varying torque loads, can adversely affect a back EMF pulse count. Similarly, starting and stopping transients can cause improper counts. Thus, even though this system reduces the cost of the motor actuator by eliminating the rheostat-type component 18, it increases the cost of the control head by requiring a highly specialized back EMF pulse counter 34. Similarly, this system requires an additional particular supplier for providing the specialized EMF pulse counter. Further, this system is often prone, over time, to get out of calibration as mistakes are introduced into its back EMF pulse count.

Thus, it is an object of this invention to provide a climate control (HVAC) system that includes relatively inexpensive and uncomplicated motor actuators having reduced numbers of terminals and wire connections. At the same time, it is an object of this invention to provide a motor actuator that provides position feedback to an MCU that is reliable under all load and wear conditions and that can be evaluated by the MCU without the use of an expensive, complicated, component that must be manufactured by a specialized manufacturer. Similarly, it is an object of this invention to provide a motor with built-in feedback that can be used in such a motor actuator and/or otherwise.

SUMMARY OF THE INVENTION

According to principles of this invention, a motor actuator of a climate control system includes an electric motor with a motor housing enclosing an encoder ring on a motor shaft having a plurality of opposite encoder-segment sets with encoder brushes on the housing wiping the encoder ring and thereby forming an encoder circuit through the opposite segments of the encoder-segment sets. The electric motor further includes power and encoder terminals positioned externally of the motor housing with at least one power terminal electrically coupled to a power brush and at least one encoder terminal electrically coupled to one of the encoder brushes. A control head of the system includes a continuity pulse counter coupled to the at least one encoder terminal for creating pulses representative of impedance/ resistance changes (continuity in a preferred embodiment) of the encoder circuit and, therefore, movement of the motor shaft and of a damper linked thereto. The motor of this invention has other possible uses.

BRIEF DESCRIPTION OF THE DRAWINGS

The invention is described and explained in more detail with reference to the drawings. The described and drawn features can be used individually or in preferred combinations in other embodiments of the invention. Other objects, features and advantages of the invention will be apparent from the following, more particular description of the invention, as illustrated in the drawings in which reference characters refer to the same parts throughout the different views. The drawings are not necessarily to scale, emphasis instead being placed upon illustrating principles of the invention in a clear manner.

DETAILED DESCRIPTION OF PREFERRED EMBODIMENTS OF THE INVENTION

Figure 1:
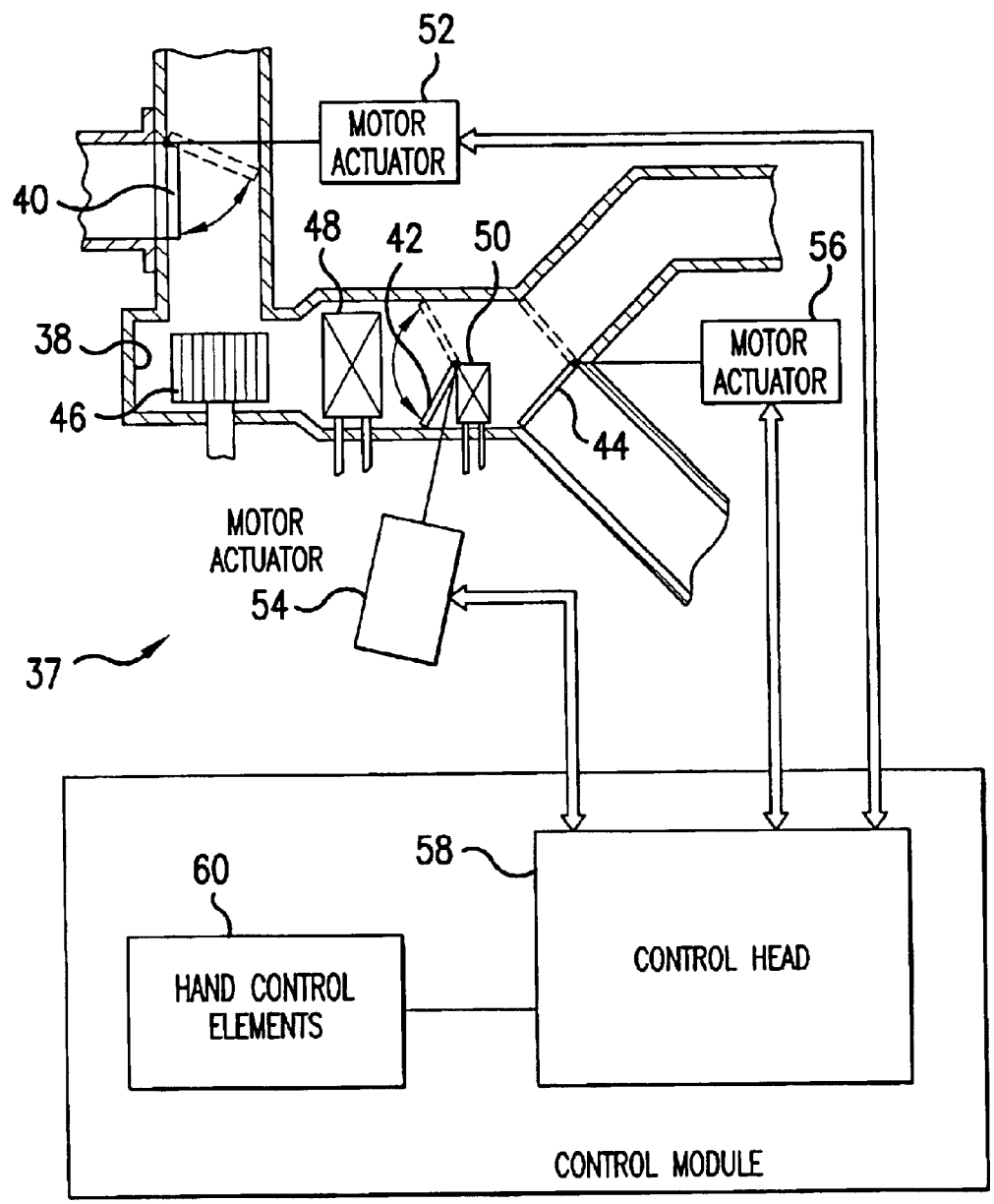
FIG. 1 is a schematic/wiring diagram of a generalized automotive climate control system of this invention, as well as of the prior art.

FIG. 1 depicts an automotive climate control system 37, otherwise known as a heating, ventilation and air-conditioning (HVAC) system that includes air passages 38 for channeling airflow. Positioned in these air passages 38, for example, are dampers 40, 42 and 44, a blower 46, an evaporator 48, and a heater core 50. The damper 40 is a recirculated/fresh-air selecting damper while the damper 42 is an air-mix damper, which determines how much air passes through the heater core 50. The damper 44 is a mode-selector damper that determines whether air is fed into a vehicle cab from up high or from down low, for example. It should be understood that these dampers, passages, and other elements are provided only as examples for purposes of explaining this invention. The climate control system could have a completely different appearance, with other passages, elements and damper placements, and still be within the invention. Similarly, it should be understood that the climate control system of FIG. 1 is generalized and applies to the prior-art systems of FIGS. 3 and 4 as well as to systems of this invention depicted in FIGS. 4–11.

Figure 2:
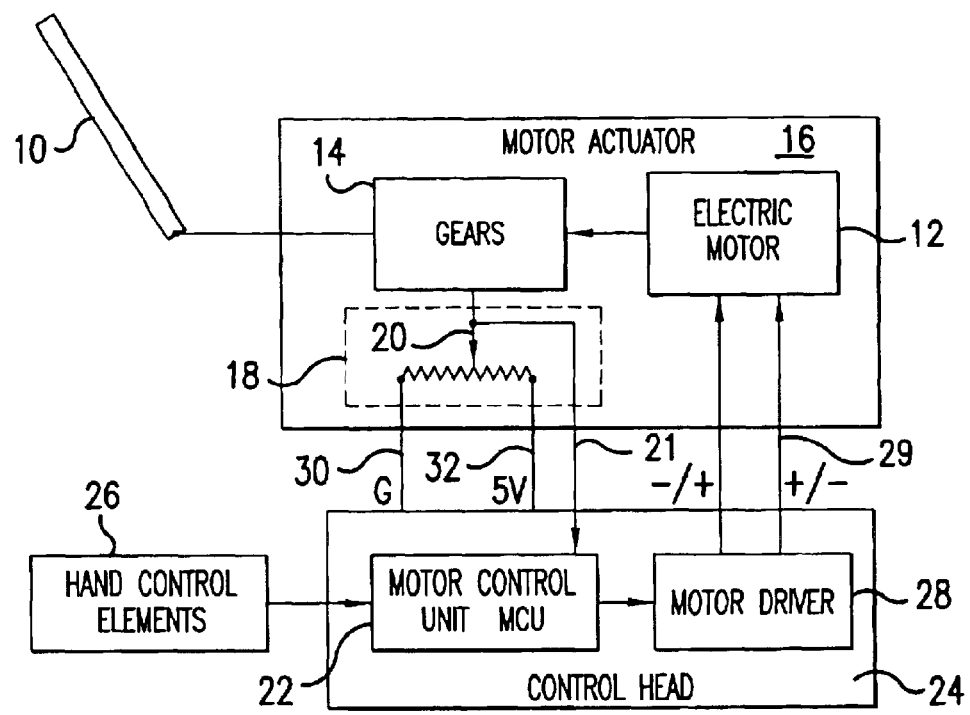
FIG. 2 is a schematic/wiring diagram of a prior-art damper control arrangement for a climate control system.

In any event, in the system of FIG. 1, electric motor actuators 52, 54 and 56 change positions of the dampers 40, 42 and 44. The motor actuators 52, 54 and 56, are driven by a control head 58 to achieve damper positions set by hand-controlled elements 60. The motor actuators also provide feedback to the control head as to the positions of the respective dampers 40, 42 and 44, so that the control head knows when dampers have achieved desired positions and can discontinue sending drive signals to the motor actuators 52, 54 and 56. Two manners in which this has been accomplished in the prior art have been described above with reference to FIGS. 2 and 3. This invention will now be described with reference to FIGS. 4–11.

Figure 4:
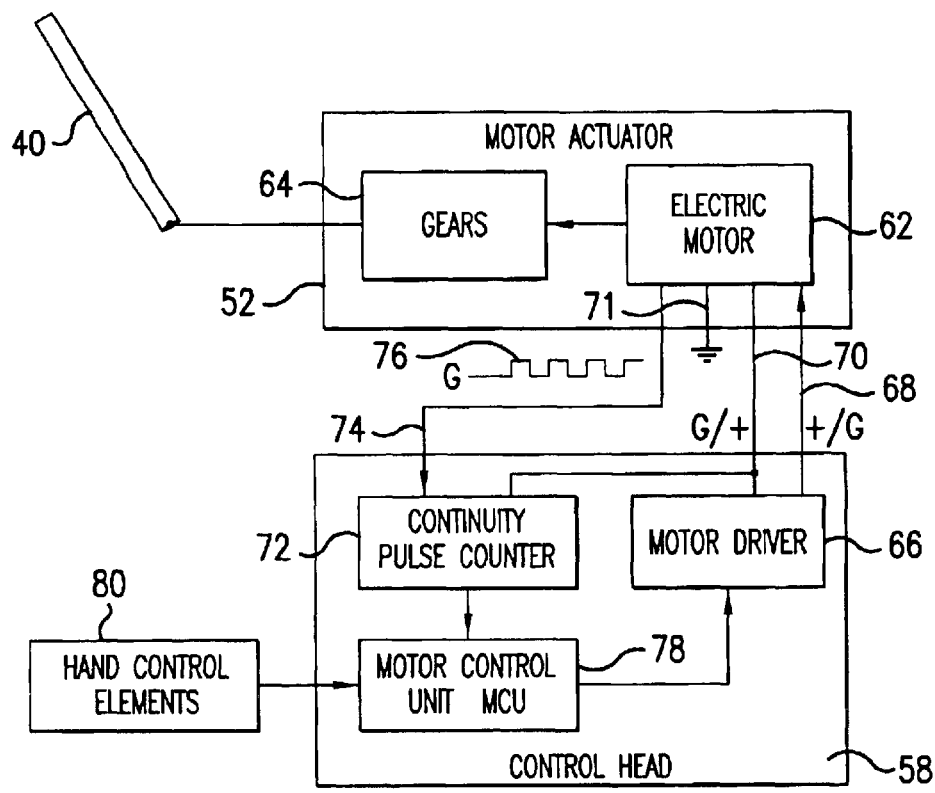
FIG. 4 is a schematic/circuit diagram similar to FIGS. 2 and 3, but illustrating a damper control arrangement of the instant invention for a climate control system.

It should be understood that only one motor actuator, for example, the motor actuator 52 in the system of FIG. 1, along with its interconnections with the control head 58, are depicted in FIG. 4; however, the same relationship applies for the motor actuators 54 and 56.

In one embodiment of this invention, the motor actuator 52, as well as the other motor actuators 54 and 56, includes a DC electric motor 62 and gears 64 for linking the electric motor 62 to the damper 40. A motor driver 66 of the control head applies a DC power signal to power lines 68 and 70 to drive the electric motor 62. In this regard, when a positive voltage is applied to line 68 and ground 71 is connected to line 70, the electric motor 62 drives in a clockwise direction. When this polarity is reversed, i.e. positive voltage on line 70 and ground on line 68, the electric motor 62 drives in a counter-clockwise direction. Each respective signal is discontinued to stop the electric motor 62.

Regarding the electric motor 62, this electric motor is a specialized electric motor of this invention that provides impedance-change feedback to a continuity pulse counter 72 of the control head 58 via a feedback line 74. In this regard, the continuity pulse counter 72 monitors a pulsed encoded signal 76 to determine the position of a motor shaft 77 (see FIG. 5) of the electric motor 62, and therefore to determine the position of the damper 40. Thus, a motor control unit MCU 78 of the control head 58 can compare the settings of hand-controlled elements 80 with an encoded pulse count appearing on the feedback line 74 to determine when the damper 40 has reached a position set by the hand-controlled elements 80.

Figure 5:
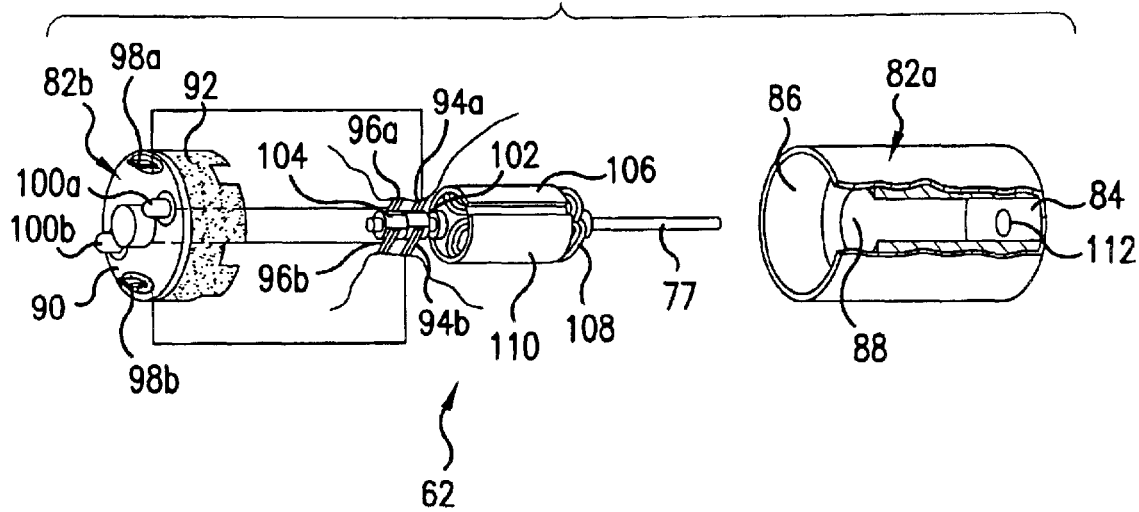
FIG. 5 is an exploded, cut, isometric view of an electric motor of the motor actuator of FIG. 4.

Looking in more detail at FIG. 5 to understand how the electric motor 62 creates the encoded signal 76, the electric motor 62 includes a motor housing formed by a housing can 82a and a housing cap 82b. The housing can 82a is in the shape of a cylinder having one end thereof closed by an end wall 84, but with an opposite open end 86. The housing can 82a encloses a stator 88 formed of one or more permanent magnets establishing North and South poles within the housing can 82a.

Figure 6:
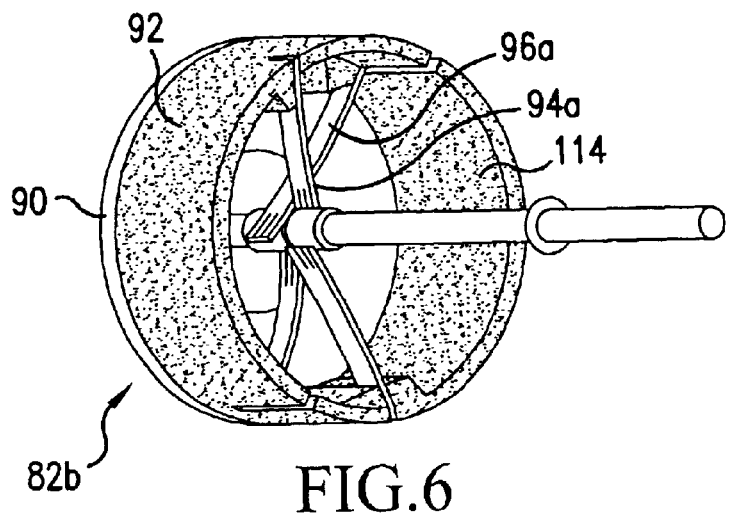
FIG. 6 is a simplified isometric view of the inside of a cap of the housing of the motor of FIG. 5, also showing the motor shaft with power and encoder rings thereon, but with the rotor being removed for simplification.
Figure 7:
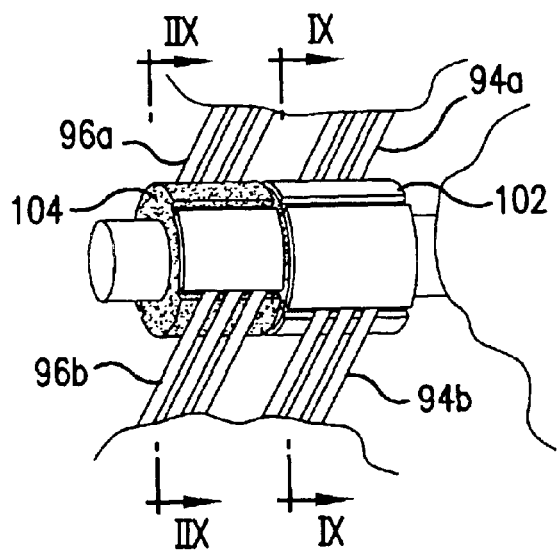
FIG. 7 is an enlarged isometric view of that portion of the shaft of FIG. 6 having the power and encoder rings thereon and segmented portions of power and encoder brushes respectively wiping these rings.
Figure 11:
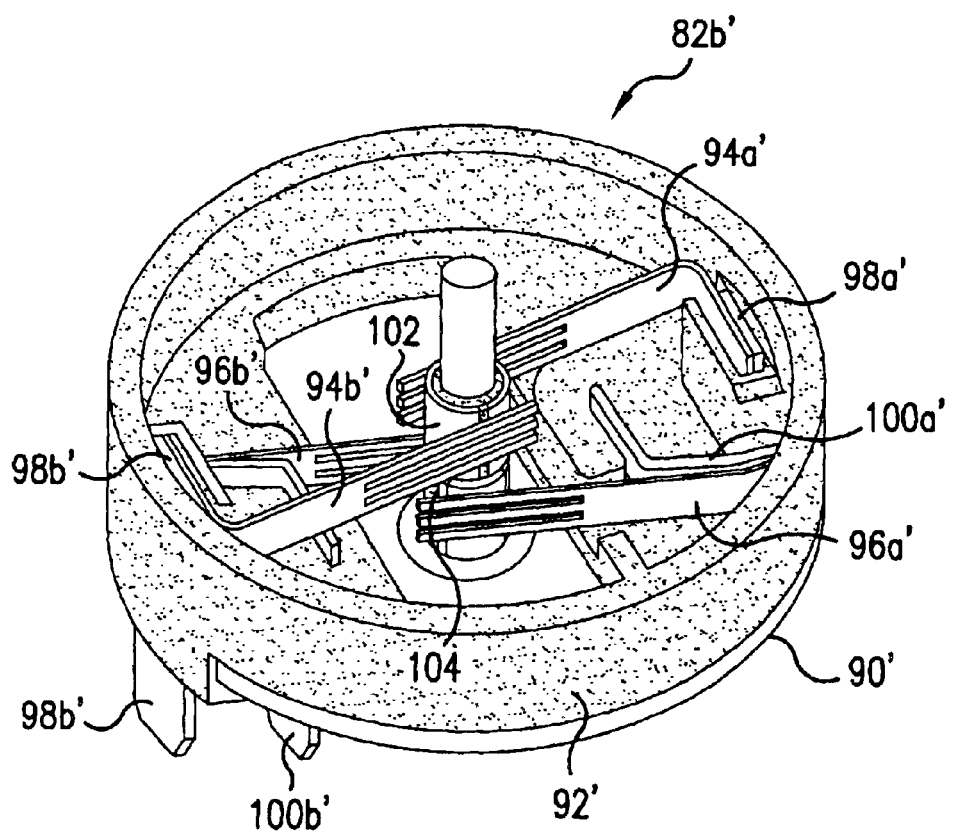
FIG. 11 is an isometric view of the inside of the housing cap of FIG. 9, but also including a cutaway motor shaft with power commutator and encoder rings thereon.

The housing cap 82b is formed of: a metallic disk 90; an insulative, resinous-plastic, brush/terminal retainer 92 attached to the metallic disk 90; power and encoder brushes 94a–b and 96a–b that are held by the brush/terminal retainer 92; and exterior power and encoder terminals 98a–b and 100a–b that are respectively in electrical contact with the power and encoder brushes 94a–b and 96a–b. In the exploded view of FIG. 5, the power and encoder brushes 94a–b and 96a–b are schematically shown separated from the rest of the housing cap 82b and only as being connected to the power and encoder terminals 98a–b and 100a–b via electrical lines. This is a schematic representation inasmuch as the power and encoder brushes 94a–b and 96a–b are actually mounted, or embedded, in the plastic brush/terminal retainer 92, as is depicted in FIG. 6 (and FIG. 11 in an alternate embodiment). Each of the respective brushes can be actually formed as one piece with its respective power and encoder terminal 98a–b and 100a–b, but this is not necessary, as is illustrated in FIG. 11.

The power brushes 94a–b wipe on a power commutator ring 102 and encoder brushes 96a–b wipe on an encoder ring 104. The power commutator ring and the encoder ring 104 are fixedly mounted on the motor shaft 77. Also fixedly mounted on the motor shaft 77, forming a rotor, is an armature 106 including coils 108 and pole pieces 110. The power and encoder brushes 94a–b and 96a–b and the armature 106 are located in the motor housing can 82a when the motor is assembled, with the motor shaft 77 extending through a hole 112 in the end wall 84 and the power commutator and encoder rings 102 and 104 being positioned in the housing can 82a as well as in a cavity 114 (FIG. 6) formed by the brush/terminal retainer 92 of the housing cap 82b.

The power commutator ring 102 is formed in the manner of a power commutator ring of a normal DC motor (see FIG. 9), that is, it has commutator segments 114 that are insulated from the shaft 77 as well as from each other by plastic insulating material 116. Each of the segments 114 is attached at different points to coils 108 so that a voltage placed across the power brushes 94a–b is sequentially applied to the segments 114 to produce current in the coils 108 for changing the electromagnetic poles of the pole pieces 110 and thereby causing repulsion and attraction relative to North and South poles of the stator 88 so as to cause the armature 106, and the attached rotor shaft 77, to rotate.

Figure 8:
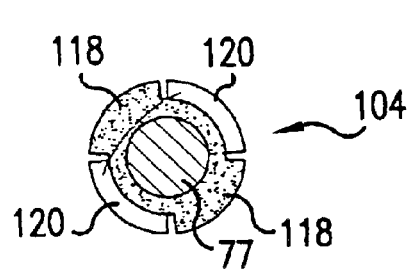
FIG. 8 is a sectional view taken on line VIII—VIII in FIG. 7, with the encoder and power brushes being removed.
Figure 9:
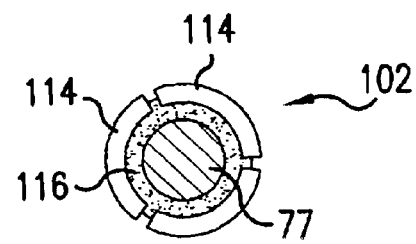
FIG. 9 is a sectional view taken on line IX—IX in FIG. 7, with the power brushes being removed.

With reference to FIG. 8, the encoder ring 104 has a somewhat different structure. In this regard, segments of a first set of opposite encoder segments 118 are insulators, formed as part of a mounting member in the FIG. 8 embodiment. Segments of a second set of opposite encoder segments 120 are electrically attached to one another, but not to the shaft 77, as indicated by a dashed line in FIG. 8. Thus, the encoder brushes 96a–b and the encoder ring 104 form an encoder circuit that is closed when the second set of opposite encoder segments 120 are in contact with the encoder brushes 96a–b and that is open when the first set of opposite encoder segments 118 are in contact with the encoder brushes 96a–b. Therefore, in order to create the encoder signal 76 (FIG. 4), the continuity pulse counter 72 simply applies a voltage through a pull-up resistor to one of the encoder brushes 96a–b across the feedback line 74, with the other encoder brush being coupled to ground. The continuity pulse counter 72 then monitors shaft rotation by monitoring the voltage (or a current) that is pulsed on and off by rotation of the encoder ring 104. In other words, as impedance of the encoder ring goes from 0 to infinity, voltage/current pulses are created that are representative of damper position.

The ground 71 is attached to one of the encoder terminals 100a–b (and therefore to one of the encoder brushes 96a–b), and the feedback line 74 is attached to the other encoder terminal (and therefore to the other of the encoder brushes 96a–b). Similarly, one motor power line 70 is attached to one of the power terminals 98a–b (and therefore to one of the power brushes 94a–b), and the other motor power line 68 is attached to the other power terminal 98a–b (and therefore to the other of the power brushes 94a–b).

Figure 9A:
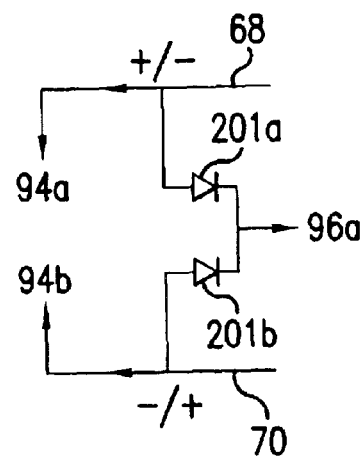
FIG. 9A is a schematic wiring diagram of a circuit use in an alternate embodiment of this invention.

It is noted that the DC electric motor 62 is substantially the same as a normal prior-art DC electric motor, with the exception that the shaft 77 at the housing cap 82b and the housing cap 82b itself are a little longer in order to accommodate the encoder ring 104 and the encoder brushes 96a–b in the motor housing. It would also be possible, in another embodiment, to make the can 82a a little longer, in which case it may not be necessary to make the housing cap 82b longer in order to accommodate the encoder ring and the encoder brushes in the motor housing. Another difference between the motor 62 and normal DC electric motors used for automotive climate control systems is that the motor 62 of this invention has four exterior terminals, two power terminals for applying electric power to the rotor, and two encoder terminals for obtaining feedback through the encoder ring 104. It is noted, however, that it would be possible to have only three terminals by having an electrical circuit (see FIG. 9A) in the motor connecting one of the encoder brushes 96a, for example, to cathodes of two diodes 201a–b, with anodes connected to separate motor power brushes 94a–b, or vice versa. Thus, first and second output lines of this circuit respectively electrically couple opposite ones of power brushes 94a–b to respective ones of first and second motor power lines (input lines) 68, 70 for feeding dc voltage, in an un-rectified form, to the power brushes 94a–b. The third output line electrically couples one of the encoder brushes 96a to both of the first and second input lines via rectifiers 201a–b for feeding the dc voltage in a rectified form to the one encoder brush 96a. In this manner, the encoder brush 96a receives the dc voltage with a fixed polarity, regardless of the polarity of the dc voltage applied to the first and second input lines for changing motor direction. This circuit automatically applies a rectified, fixed-polarity voltage to the encoder brush 96a using the power signals, thus a fourth terminal for applying a voltage to the encoder brushes can be avoided. This circuit can also be external of the motor housing, but then it would be difficult to avoid a fourth terminal.

In operation, an operator manipulates hand control elements 80 to achieve a specific climate control that requires a particular desired position of the damper 40. The MCU 78 activates the motor driver 66 to apply a DC power voltage across the motor power lines 70–68 to drive the electric motor 62. At the same time, the continuity pulse counter 72 monitors a DC feedback voltage at the feedback line 74. As the motor shaft 77 rotates, opposite segments 118 and 120 of the encoder ring 104 alternately come in contact with the encoder brushes 96a–b and therefore close and open this encoder circuit. Thus, the feedback voltage on the line 74 is an encoded signal 76 representative of impedance changes in the encoder circuit that is counted by the continuity pulse counter 72. The count is fed to the MCU and when the count corresponds to the desired position of the damper 10, the MCU orders the motor driver 66 to discontinue the power voltage on power lines 70–48, thereby stopping the motor 62.

It will be understood by those skilled in the art that the climate control system of this invention has a relatively uncomplicated motor actuator including only the electric motor and the gears therefor. In other words, it does not require a potentiometer-type circuit with additional electrical lines for determining positions of the damper. Thus, it requires fewer lines between the motor actuator and the control head than do systems that involve potentiometer-type circuits in the motor actuator.

Figure 3:
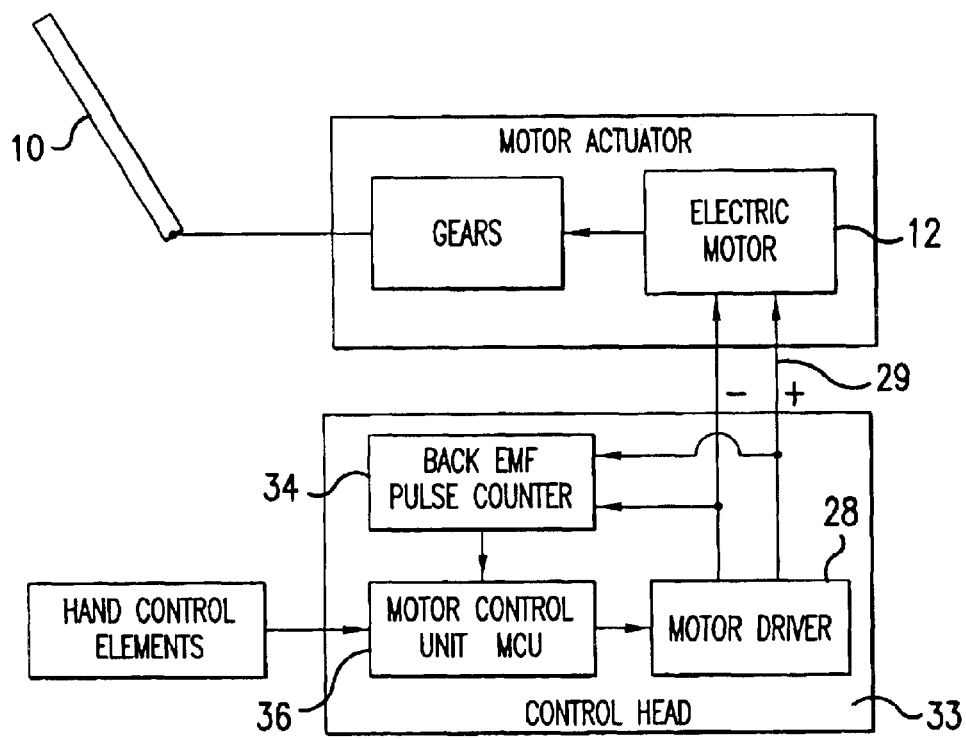
FIG. 3 is another prior-art damper control arrangement for a climate control system.

Although the climate control system of this invention requires one more electrical line between the control head and the motor actuator than does the back EMF pulse counter system of FIG. 3, it avoids many of the problems of using a back EMF pulse counter. In this regard, the pulse-encoded signal 76 of this invention is a definite signal that is formed by a closed/open continuity circuit between the encoder brushes 96a–b and the first and second sets of opposite encoder segments 118 and 120 of the encoder ring 104. Thus, once the damper control system of FIG. 4 is calibrated to the damper 40, the control head 58 knows all other positions of the damper. Further, this signal is not adversely affected by a load applied to the electric motor 62 nor is it unduly changed by brush wear. Thus, the pulses of the pulse-encoded signal 76 never thereafter "slip", and the calibration remains true.

It should be noted that although in this embodiment the encoder circuit is either open (infinite resistance/impedance) or closed (no resistance/impedance), an important aspect is that the encoder ring has a plurality of sets of opposite encoder segments with significantly different amounts of impedance between opposite encoder segments of adjacent encoder-segment sets. In other words, it is not necessary that the encoder ring completely open and close the encoder circuit in order to create an encoded pulse signal.

Yet another advantage of this invention is that the continuity pulse counter 72 is an uncomplicated component, since it must only apply a voltage to the encoder brushes 96a and 96b, and then monitor a current/voltage pulse signal thereby modulated. A highly specialized manufacturer need not manufacture such a component.

Although this invention has been described as used in particular embodiments, it will be understood by those of ordinary skill in the art that many changes can be made therein within the scope of the invention. For example, the electric motor, and/or the motor actuator could have applications other than in a climate control system. It is also noted that greater resolution in the encoded signal 76 could be obtained by having additional sets of opposite encoder segments in the encoder ring 104. In other words, there could be two, or more, sets each of insulation and conductive encoder segments in the encoder ring 104. Further, there could be four or more electrical lines between the control head and the motor actuator and still be in the scope of this invention. In addition, the hand-control elements and electrical circuits within the control module need not be as shown in FIG. 4 to be within the scope of this invention.

Figure 10:
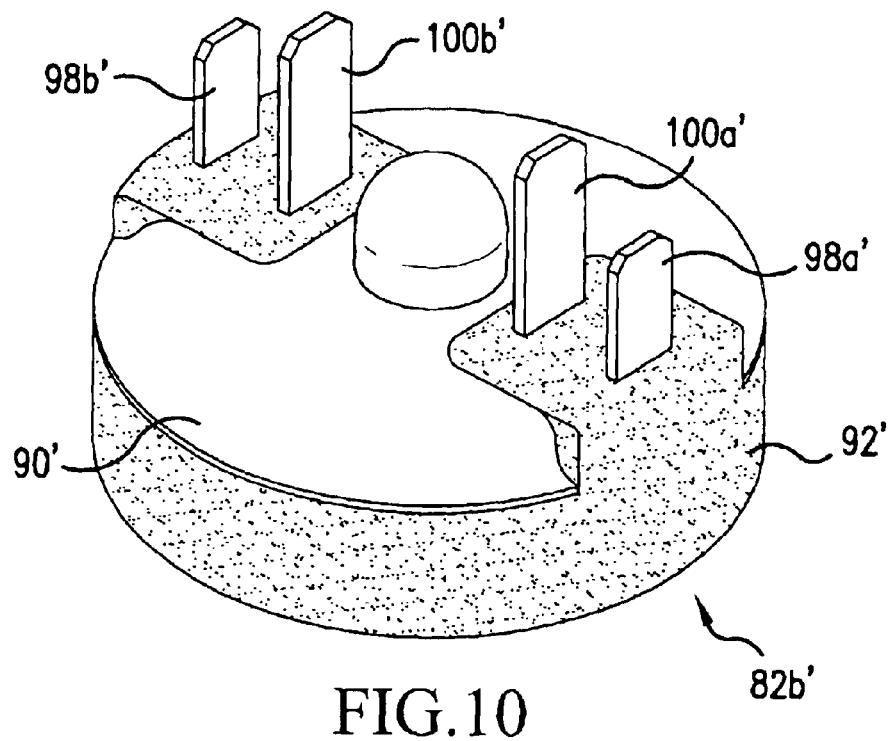
FIG. 10 is an isometric view of the outside of a housing cap of an alternate-embodiment electric motor of this invention.

Regarding other embodiments, an alternate embodiment housing cap 82b' is depicted in FIGS. 10 and 11 in which encoder terminals 100a'–b' and power terminals 98a'–b' are arranged in a radial line on the cap 82b'. The relationship between a metallic disk 90' and an insulator brush/terminal retainer 92' are somewhat clearer in these views than in previous views.

We claim:

1. A climate control system including at least one air passage and at least one damper for regulating flow of air through said at least one air passage, said climate control system further comprising:

an electric motor coupled to said damper for changing the position of the damper;

a control module including a hand-manipulated hand control element for setting a desired damper position for said at least one damper and a control head for generating electrical power signals for driving said electric motor to move said damper to said desired damper position;

wherein said electric motor comprises a motor housing enclosing therein: a stator, a rotor inside said stator, a motor shaft attached to said rotor, a commutator ring mounted on said motor shaft, power brushes mounted on said housing and wiping said commutator ring for feeding electric power to said motor for driving said rotor, an encoder ring mounted on said motor shaft having a plurality of encoder segments separated from one another about the motor shaft, and encoder brushes mounted on said housing and wiping said encoder ring for forming an encoder circuit through said encoder segments with said encoder segments closing and opening said encoder circuit upon rotation of said motor shaft;

said electric motor further including power and encoder terminals positioned externally of said motor housing, at least one power terminal being electrically coupled to one of said power brushes and at least one encoder terminal being electrically coupled to one of said encoder brushes;

wherein said control head is coupled to said at least one power terminal for applying said electrical power signals to said electric motor for moving said damper and to said at least one encoder terminal for monitoring the impedance of said encoder circuit to thereby determine when the damper is in said desired damper position.

2. A climate control system as in claim 1, wherein said electric motor is part of a motor actuator including gears arranged between said electric motor and said damper.

3. A climate control system as in claim 2, wherein there are a plurality of passages, a plurality of dampers, and a plurality of motor actuators, each motor actuator being driven separately by said control module.

4. A climate control system as in claim 1, wherein said motor has at least two power terminals and at least two encoder terminals separate from said at least two power terminals.

5. A climate control system as in claim 1, wherein said electric motor is a DC motor.

6. A climate control system as in claim 1, wherein said motor housing is formed of a housing can and a housing cap, with the power and encoder brushes and terminals being mounted on the cap.

7. A climate control system as in claim 6, wherein the motor shaft passes through the housing can at one end thereof and is rotatably mounted in the housing cap at its opposite end.

8. A climate control system as in claim 6, wherein said housing cap is formed of a metal disk and a cylindrically-shaped insulating material for extending into said housing can and for supporting said power and encoder brushes as well as said power and encoder terminals.

9. A climate control system as in claim 1, wherein is further included an electrical circuit having first and second input lines for receiving dc voltage thereacross from said control head to provide said electric power and first, second and third output lines, wherein said first and second output lines respectively electrically couple opposite ones of said power brushes to respective ones of said first and second input lines for feeding said dc voltage to said power brushes and said third output line electrically couples one of said encoder brushes to both of said first and second input lines via rectifiers for feeding said dc voltage in a rectified form to said one of said encoder brushes, whereby said one of said encoder brushes receives said dc voltage with a fixed polarity, regardless of the polarity of dc voltage applied to the first and second input lines.

10. A climate control system as in claim 9, wherein said electrical circuit is inside said motor housing.

11. A climate control system as in claim 1, wherein there is only one encoder terminal.

12. A climate control system as in claim 1, wherein:
there are first and second encoder brushes;
first and second conductive encoder segments of said plurality of encoder segments form a first conductive encoder-segment set with said first and second conductive encoder segments of the conductive encoder-segment set being separated from one another about the motor shaft but being conductively coupled with one another; and
the first encoder brush is positioned for contacting the first conductive encoder segment when the second encoder brush is positioned for contacting the second conductive encoder segment for closing the encoder circuit.

13. An electric motor actuator comprising an electric motor and gears, wherein, said electric motor comprises a motor housing enclosing therein: a stator, a rotor inside said stator, a motor shaft attached to said rotor, a commutator ring mounted on said motor shaft, power brushes mounted on said housing and wiping said commutator ring for feeding electric power to said motor for driving said rotor, an encoder ring mounted on said motor shaft having a plurality of encoder-segment sets of corresponding encoder segments with significantly different amounts of impedance between corresponding encoder segments of adjacent encoder-segment sets, and encoder brushes mounted on said housing and wiping said encoder ring for forming an encoder circuit through said corresponding segments of said encoder-segment sets;
said electric motor further including power and encoder terminals positioned externally of said motor housing, at least one power terminal being electrically coupled to one of said power brushes and at least one encoder terminal being electrically coupled to one of said encoder brushes.

14. An electric motor actuator as in claim 13, wherein said motor has at least two power terminals and at least two encoder terminals separate from said at least two power terminals.

15. An electric motor actuator as in claim 13, wherein said electric motor is a DC motor.

16. An electric motor actuator as in claim 13, wherein said motor housing is formed of a housing can and a housing cap, with the power and encoder brushes and terminals being mounted on the cap.

17. An electric motor actuator as in claim 16, wherein the motor shaft passes through the housing can at one end thereof and is rotatably mounted in the housing cap at its opposite end.

18. An electric motor actuator as in claim 16, wherein said housing cap is formed of a metal disk and a cylindrically-shaped insulating material for extending into said housing can and for supporting said power and encoder brushes as well as said power and encoder terminals.

19. An electric motor actuator as in claim 13, wherein is further included an electrical circuit having first and second input lines for receiving DC voltage thereacross to provide said electric power and first, second and third output lines, wherein said first and second output lines respectively electrically couple opposite ones of said power brushes to respective ones of said first and second input lines for feeding said dc voltage to said power brushes and said third output line electrically couples one of said encoder brushes to both of said first and second input lines via rectifiers for feeding said dc voltage in a rectified form to said one of said encoder brushes, whereby said one of said encoder brushes receives said dc voltage with a fixed polarity, regardless of the polarity of dc voltage applied to the first and second input lines.

20. An electric motor actuator as in claim 19, wherein said electrical circuit is inside said motor housing.

21. An electric motor actuator as in claim 13, wherein there is only one encoder terminal.

22. An electric motor actuator as in claim 13, wherein said corresponding segments are opposite segments.

23. An electric motor actuator as in claim 13, wherein:
there are first and second encoder brushes;
first and second conductive encoder segments form one of said encoder-segment sets, with said first and second conductive encoder segments of the one encoder-segment set being separated from one another about the motor shaft but being conductively coupled with one another; and
the first encoder brush is positioned for contacting the first conductive encoder segment when a second encoder brush is positioned for contacting the second conductive encoder segment for closing the encoder circuit.

24. An electric motor including a motor housing enclosing therein: a stator, a rotor inside said stator, a motor shaft attached to said rotor, a commutator ring mounted on said motor shaft, power brushes mounted on said housing and wiping said commutator ring for feeding electric power to said motor for driving said rotor, an encoder ring mounted on said motor shaft having a plurality of encoder-segment sets of corresponding encoder segments with significantly different amounts of impedance between corresponding encoder segments of adjacent encoder-segment sets, and encoder brushes mounted on said housing and wiping said encoder ring for forming an encoder circuit through said corresponding segments of said encoder segment sets;
said electric motor further including power and encoder terminals positioned externally of said motor housing, at least one power terminal being electrically coupled to one of said power brushes and at least one encoder terminal being electrically coupled to one of said encoder brushes.

25. An electric motor as in claim 24, wherein said motor has at least two power terminals and at least two encoder terminals separate from said at least two power terminals.

26. An electric motor as in claim 24, wherein said electric motor is a DC motor.

27. An electric motor as in claim 24, wherein said motor housing is formed of a housing can and a housing cap, with the power and encoder brushes and terminals being mounted on the cap.

28. An electric motor as in claim 27, wherein the motor shaft passes through the housing can at one end thereof and is rotatably mounted in the housing cap at its opposite end.

29. An electric motor as in claim 27, wherein said housing cap is formed of a metal disk and a cylindrically-shaped insulating material for extending into said housing can and for supporting said power and encoder brushes as well as said power and encoder terminals.

30. An electric motor as in claim 24, wherein is further included an electrical circuit having first and second input lines for receiving dc voltage thereacross to provide said electric power and first, second and third output lines, wherein said first and second output lines respectively electrically couple opposite ones of said power brushes to respective ones of said first and second input lines for feeding said dc voltage to said power brushes and said third output line electrically couples one of said encoder brushes to both of said first and second input lines via rectifiers for feeding said dc voltage in a rectified form to said one of said encoder brushes, whereby said one of said encoder brushes receives said dc voltage with a fixed polarity, regardless of the polarity of the dc voltage applied to the first and second input lines.

31. An electric motor as in claim 30, wherein said electrical circuit is inside said motor housing.

32. An electric motor as in claim 24, wherein there is only one encoder terminal.

33. An electric motor as in claim 24, wherein said corresponding segments are opposite segments.

34. An electric motor actuator as in claim 24, wherein:

there are first and second encoder brushes;

first and second conductive encoder segments form one of said encoder-segment sets, with said first and second conductive encoder segments of the one encoder-segment set being separated from one another about the motor shaft but being conductively coupled with one another; and the first encoder brush is positioned for contacting the first conductive encoder segment when a second encoder brush is positioned for contacting the second conductive encoder segment for closing the encoder circuit.

* * * * *